(12) United States Patent
Young et al.

(10) Patent No.: US 11,934,374 B2
(45) Date of Patent: Mar. 19, 2024

(54) NETWORK-BASED CONTENT SUBMISSION AND CONTEST MANAGEMENT

(71) Applicants: David Young, Bellevue, WA (US); Terrence Nevins, Bellevue, WA (US); Douglas de la Torre, Bellevue, WA (US)

(72) Inventors: David Young, Bellevue, WA (US); Terrence Nevins, Bellevue, WA (US); Douglas de la Torre, Bellevue, WA (US)

( * ) Notice: Subject to any disclaimer, the term of this patent is extended or adjusted under 35 U.S.C. 154(b) by 0 days.

(21) Appl. No.: 15/992,107

(22) Filed: May 29, 2018

(65) Prior Publication Data
US 2018/0341670 A1 Nov. 29, 2018

Related U.S. Application Data

(60) Provisional application No. 62/511,509, filed on May 26, 2017.

(51) Int. Cl.
| | |
|---|---|
| *G06K 9/34* | (2006.01) |
| *G06F 16/23* | (2019.01) |
| *G06T 11/60* | (2006.01) |
| *H04W 4/18* | (2009.01) |
| *G06Q 30/02* | (2023.01) |

(52) U.S. Cl.
CPC ............ *G06F 16/235* (2019.01); *G06T 11/60* (2013.01); *H04W 4/185* (2013.01); *G06Q 30/0278* (2013.01)

(58) Field of Classification Search
CPC ........ G06F 16/235; G06F 16/29; G06T 11/60; H04W 4/185; H04W 4/029; G06Q 30/0278; H04L 63/20; H04L 63/101
USPC ........................................................ 382/182
See application file for complete search history.

(56) References Cited

U.S. PATENT DOCUMENTS

| | | | | |
|---|---|---|---|---|
| 8,185,132 B1 * | 5/2012 | Katpelly | ............... | H04W 4/185 |
| | | | | 455/445 |
| 8,365,243 B1 * | 1/2013 | Lu | ........................ | G06F 21/6209 |
| | | | | 726/1 |
| 8,950,007 B1 * | 2/2015 | Teal | ........................ | G06F 21/57 |
| | | | | 726/30 |
| 9,256,806 B2 * | 2/2016 | Aller | ....................... | G06Q 30/06 |
| 9,602,738 B2 * | 3/2017 | Choe | ..................... | A63F 13/352 |
| 10,084,818 B1 * | 9/2018 | Roth | ........................ | H04L 63/20 |
| 10,467,399 B2 * | 11/2019 | O'Malley | ................. | G07C 9/00 |
| 2008/0019317 A1 * | 1/2008 | Vellanki | ............ | H04M 1/72572 |
| | | | | 370/331 |

(Continued)

*Primary Examiner* — Mahendra R Patel
(74) *Attorney, Agent, or Firm* — Seattle Patent Group LLC; James Haugen

(57) ABSTRACT

In one aspect, the present disclosure implements a method that determines whether a submitted image satisfies a geographic constraint which includes defining a rule that establishes a geographic restriction on the submitted image, accessing a geo-code associated with the submitted image, determining whether the geo-code indicates that the submitted image was taken at a location that violates the geographic restriction defined in the rule, and if a determination is made that the submitted image was taken at a location that violates the geographic restriction defined in the rule, eliminating the submitted image from being considered a valid entry in the contest.

12 Claims, 9 Drawing Sheets

502 Photo Themes
Photo description or contest description

504 Photo Tags

Recourses to help improve color/contrast
Link A
Link B

Your photo contest results are in. 500

Final Score
96th Percentile 506

Photo Performance Over Time
Compared to Average Winning Photo

Spider Graph Results

(56) References Cited

U.S. PATENT DOCUMENTS

| | | | | |
|---|---|---|---|---|
| 2008/0205789 | A1* | 8/2008 | Ten Kate | G06T 11/60 |
| | | | | 382/284 |
| 2010/0020093 | A1* | 1/2010 | Stroila | G01C 21/20 |
| | | | | 345/589 |
| 2011/0313874 | A1* | 12/2011 | Hardie | G06Q 30/0639 |
| | | | | 705/26.1 |
| 2012/0311574 | A1* | 12/2012 | Song | G06F 11/3093 |
| | | | | 718/1 |
| 2014/0270547 | A1* | 9/2014 | Dwan | G06F 16/51 |
| | | | | 382/224 |
| 2014/0270550 | A1* | 9/2014 | Dwan | G06F 16/23 |
| | | | | 382/225 |
| 2015/0120661 | A1* | 4/2015 | Keebler | G06F 16/27 |
| | | | | 707/627 |
| 2016/0149956 | A1* | 5/2016 | Birnbaum | H04L 63/20 |
| | | | | 726/1 |
| 2016/0155332 | A1* | 6/2016 | Wang | G08G 1/015 |
| | | | | 340/932.2 |
| 2016/0232785 | A1* | 8/2016 | Wang | G08G 1/0129 |
| 2017/0098376 | A1* | 4/2017 | Wang | G08G 1/017 |
| 2017/0301118 | A1* | 10/2017 | Lanza | G06T 11/60 |

* cited by examiner

NETWORK-BASED CONTENT SUBMISSION AND CONTEST MANAGEMENT

CROSS-REFERENCE TO RELATED APPLICATION

This application claims the benefit of U.S. Provisional Application No. 62/511,509, entitled "NETWORK-BASED CONTENT SUBMISSION AND CONTEST MANAGEMENT" filed May 26, 2017, which is hereby incorporated by reference.

BACKGROUND

The world is becoming increasingly multimedia-rich, where the ubiquity of camera-phones and digital cameras, combined with increasingly popular photo-sharing websites (e.g. Flickr, Photo-bucket, Picasa) and online social networks (e.g. Facebook, Instagram, Twitter) result in billions of consumer photographs available over the Internet, as well as in personal photo repositories. With this growth in the creation and sharing of digital images comes opportunities for various entities to better-engage a user base. One way to engage a user base is to sponsor a contest where submitted images are judged relative to each other with the best submissions being recognized or rewarded in some manner. Photo contests have traditionally required users to submit paper copies of images for judging. More recently, digital images have been submitted and judged using electronic mail or other network transmission technology. However, managing a photo contest is time-intensive and potentially cost-prohibitive especially when a large number of photos are submitted and need to be judged.

It is easy to recognize that the quantity of digital images and other media has grown exponentially with computers and especially the proliferation of mobile devices. However, the ability to identify the quality or aesthetic value of images and the selection of images that would be rated as aesthetically appealing has lagged behind the growth in multi-rich content. In the world of photography, the term aesthetics refers to the concept of appreciation and judgement of beauty and taste in photographic images, which is generally a subjective measure, highly dependent on image content and personal preferences. There is not a universally agreed upon objective measure of aesthetics. Hence, the problem of image aesthetic assessment is an extremely challenging task. A number of efforts have been made in processing images using computers to automatically identify those images that are aesthetically pleasing. These efforts have met with a limited amount of success, as identifying the "best" images that satisfy a criteria has proven difficult.

It would be beneficial to have a system that makes it easy and convenient to manage a contest utilizing network technologies to share data between the relevant participants. Preferably, the system would enable images to be judged in a way that is easy and convenient for both the user base and the contest sponsor.

SUMMARY

This Summary is provided to introduce a selection of concepts in a simplified form that are further described below in the Description. This Summary is not intended to identify key features or essential features of the claimed subject matter, nor is the Summary to be used as an aid in determining the scope of the claimed subject matter.

In one aspect, the present disclosure implements a method that determines whether a submitted image satisfies a geographic constraint which includes defining a rule that establishes a geographic restriction on the submitted image, accessing a geo-code associated with the submitted image, determining whether the geo-code indicates that the submitted image was taken at a location that violates the geographic restriction defined in the rule, and if a determination is made that the submitted image was taken at a location that violates the geographic restriction defined in the rule, eliminating the submitted image from being considered a valid entry in the contest.

DESCRIPTION OF THE DRAWINGS

The foregoing aspects and many of the attendant advantages will become more readily appreciated as the same become better understood by reference to the following detailed description, when taken in conjunction with the accompanying drawings, wherein.

DESCRIPTION

Figure 1:
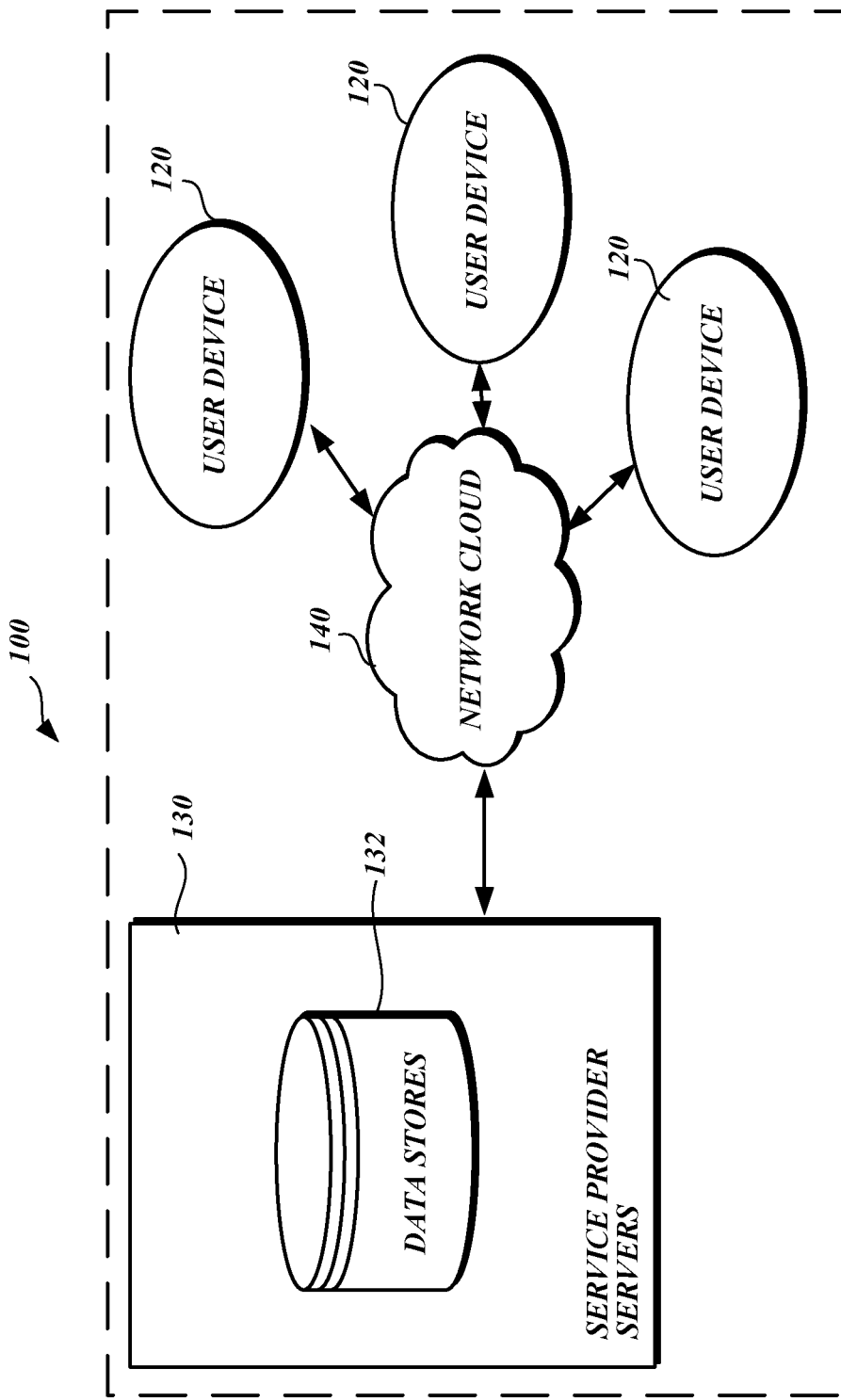
FIG. 1 is a block diagram depicting an exemplary cloud computing environment where described embodiments of the disclosed subject matter can be implemented.

The description set forth below is intended as a description of various embodiments of the disclosed subject matter and is not intended to represent the only embodiments. Each embodiment described herein is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In one aspect, the present disclosure implements an application capable of being executed by computing devices such as a mobile phones, tablets, laptop computers, desktops, server computers, and the like. In various embodiments, the application enables users to submit user-generated content, such as photos, to one or more online contests that are judged relative to other submissions or criteria. The user-generated content may be accepted or rejected upon submission using pre-processing tools which may also serve to decrease the total set of pictures being available for human judging. These pre-processing tools provided by the present disclosure can ensure compatibility with the contest requirements before completion of a submission. Also, the pre-processing tools may measure certain attributes of a submitted photo as described in further detail below. Systems are provided to enable humans, which may include experts, participants, sponsors, employees, friends or any other group to critique and judge submitted photos using various criteria. In some embodiments, submitted images are judged against the submissions of other entrants thereby identifying a ranking among a plurality of submissions. In this way, the present disclosure facilitates the management of a contest to rank, analyze, and tag the user-submitted content. While the description provided herein is primarily made in the context of user-submitted images, the submissions may be other types of user-generated content without departing from the scope of the claimed subject matter.

In additional aspects, the present disclosure provides a marketplace for the submission and sale of user-generated content such as images. Artists are able to submit images for sale within the marketplace. Once offered for sale, users may browse and access various types of images that have been made available for purchase. In this regard, images may be accessed according to one or more display categories such as whether an image is a contest winner, content type, or other criteria. As described in further detail below, aspects of the present invention also performs pre-processing to identify particular content (people, places, and things) that is depicted in submitted images. This content as well as descriptors provided by users or machine vision systems may be associated with submitted images as, for example, meta data. As a result of this processing, searches may be performed and images may be accessed according to the content or descriptors represented in their associated metadata. For identified images, the marketplace enables user to acquire image rights and gain access to purchased images.

Referring now to FIG. 1, the following is intended to provide a general overview of a system environment 100 where embodiments of the disclosed subject matter may be implemented. The illustrative system environment 100 depicted in FIG. 1 includes one or more user devices, such as user device(s) 120, configured to communicate with other user devices or with the service provider server(s) 130 via a network cloud 140. The user device 120 may be any one of a number computing devices such as, but not limited to, mobile phones, laptop or tablet computers, personal digital assistants (PDAs), desktops, media players, game consoles, home messaging base stations and routers, or any other device configured to perform communications via the network cloud 140.

As shown in FIG. 1, the user device 120 can communicate with the service provider server 130 via the network cloud 140. In some embodiments, the service provider server 130 may include one or more data store(s) 132. The data store 132 may store various types of information such as but not limited to user behavior history, user profile information (e.g., user account information), billing information, knowledge base, etc. In an illustrative embodiment, the data store 132 may also contain transaction data relative to users. This transaction data may include, but is not limited to transaction type (purchase, award, etc.), actual cost, actual revenue, date of transaction, and geolocation of transaction. While the data stores 132 in FIG. 1 are shown as being associated with the service provider server 130, one skilled in the art will recognize that other implementations are possible. Increasingly, data storage and database services are available as cloud services. Accordingly, in other embodiments, the data stores 132 may be available as a cloud service without departing from the scope of the claimed subject matter.

It should be well understood that the user devices 120 are not required to have a dedicated network connection in order to submit images or participate in a contest. In this regard, the application provided by the present disclosure may be configured to principally execute locally on the client computing device. Various types of user data and actions may be cached on a client computing device but can persist to the service provider server 130 once a network connection is re-established. Accordingly, communications between the user devices 120 and the server-side data center 102 may be intermittent and optimized for a particular type of network such as a containerized network on-board a cruise ship, commercial airline, and the like.

Figure 2:
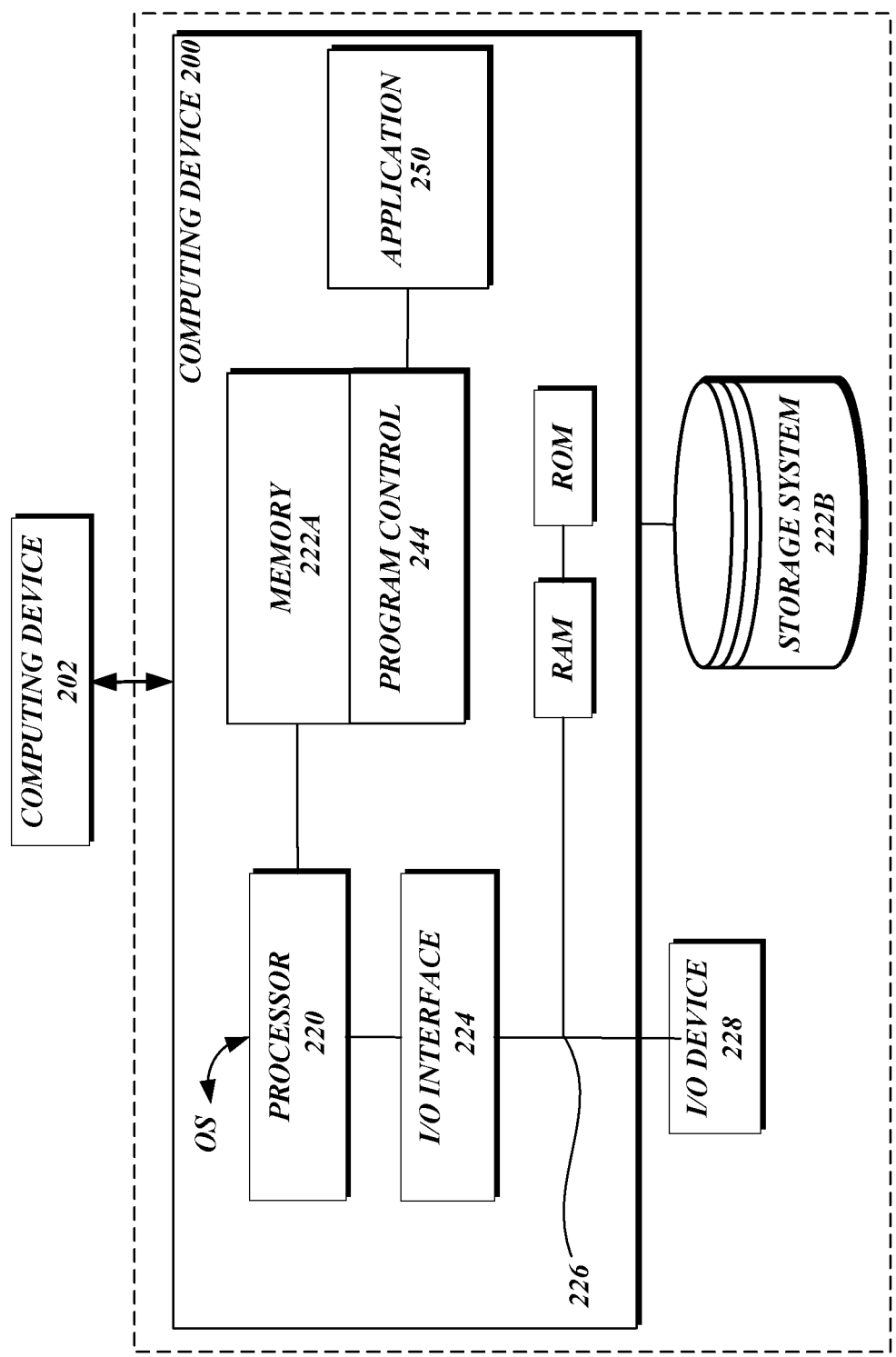
FIG. 2 is a block diagram illustrating the components of a computing device configured to perform functions in accordance with the present disclosure.

Now with reference to FIG. 2, additional description will be provided regarding the service provider servers 130 (FIG. 1) and user devices 120 (FIG. 1). In embodiments, the user devices 120 can be mobile devices (smart phones and tablets), desktop computers, or any other similar device capable of executing an "app" provided by the present disclosure or a Web browser. The servers 130 can be a standalone server, which implements the processes of the present invention within a networking environment. In this regard, the architecture of the servers 130 or user devices is depicted in FIG. 2 in the computing device 200 which can be resident on a network infrastructure. As shown, the computing device 200 includes a processor 220 (e.g., a CPU), a memory 222A, an I/O interface 224, and a bus 226. The bus 226 provides a communications link between each of the components in the computing device 200. In addition, the computing device 200 includes a random access memory (RAM), a read-only memory (ROM), and an operating system (O/S). The computing device 200 is in communication with the external I/O device 228 and a storage system 222B. The I/O device 228 can comprise any device that enables an individual to interact with the computing device 200 (e.g., user interface) or any device that enables the computing device 200 to communicate with one or more other computing devices (e.g., user devices 120) using any type of communications link.

The processor 220 executes computer program code (e.g., program control 244), which can be stored in the memory 222A and/or storage system 222B. In embodiments, the program control 244 of the computing device 200 provides an application 250, which comprises program code that is adapted to perform one or more of the processes described herein. The application 250 can be implemented as one or more program code in the program control 244 stored in memory 222A as separate or combined modules. Additionally, the application 250 may be implemented as separate dedicated processors or a single or several processors to provide the functions described herein. While executing the computer program code, the processor 220 can read and/or write data to/from memory 222A, storage system 222B, and/or I/O interface 224. In this manner, the program code executes the processes of the present disclosure.

The program code can include computer program instructions that are stored in a computer-readable storage medium. The computer program instructions may also be loaded onto a computer, other programmable data processing apparatus, or other devices to cause a series of operational steps to be performed on the computing device. Moreover, any methods provided herein in the form of flowcharts, block diagrams or otherwise may be implemented using the computer program instructions, implemented on the computer-readable storage medium. The computer-readable storage medium comprises any non-transitory medium per se, for example, such as electronic, magnetic, optical, electromagnetic, infrared, and/or semiconductor system. More specific examples (a non-exhaustive list) of the computer-readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer-readable storage medium may be any tangible medium that can contain or store a program for use by or in connection with an instruction execution system, apparatus, or device of the present invention.

Now with reference to FIG. 3 a contest management method 300 operable to manage a network-based contest in accordance with the present invention will be described. In general, the contest management method 300 is responsible for accepting user submissions to a contest and ranking the received submissions. Each user submission is processed to ensure that the submission meets certain specified criteria. If the specified criteria are satisfied, then a submission is accepted for entry into the contest. Once a sufficient number of submissions are received, a force ranking process (FIG. 4) is undertaken to compare user submissions accordingly. The force ranking process may be used to identify a contest winner and/or determine whether submitted images best satisfy a specified criteria as described in further detail below.

Figure 3:
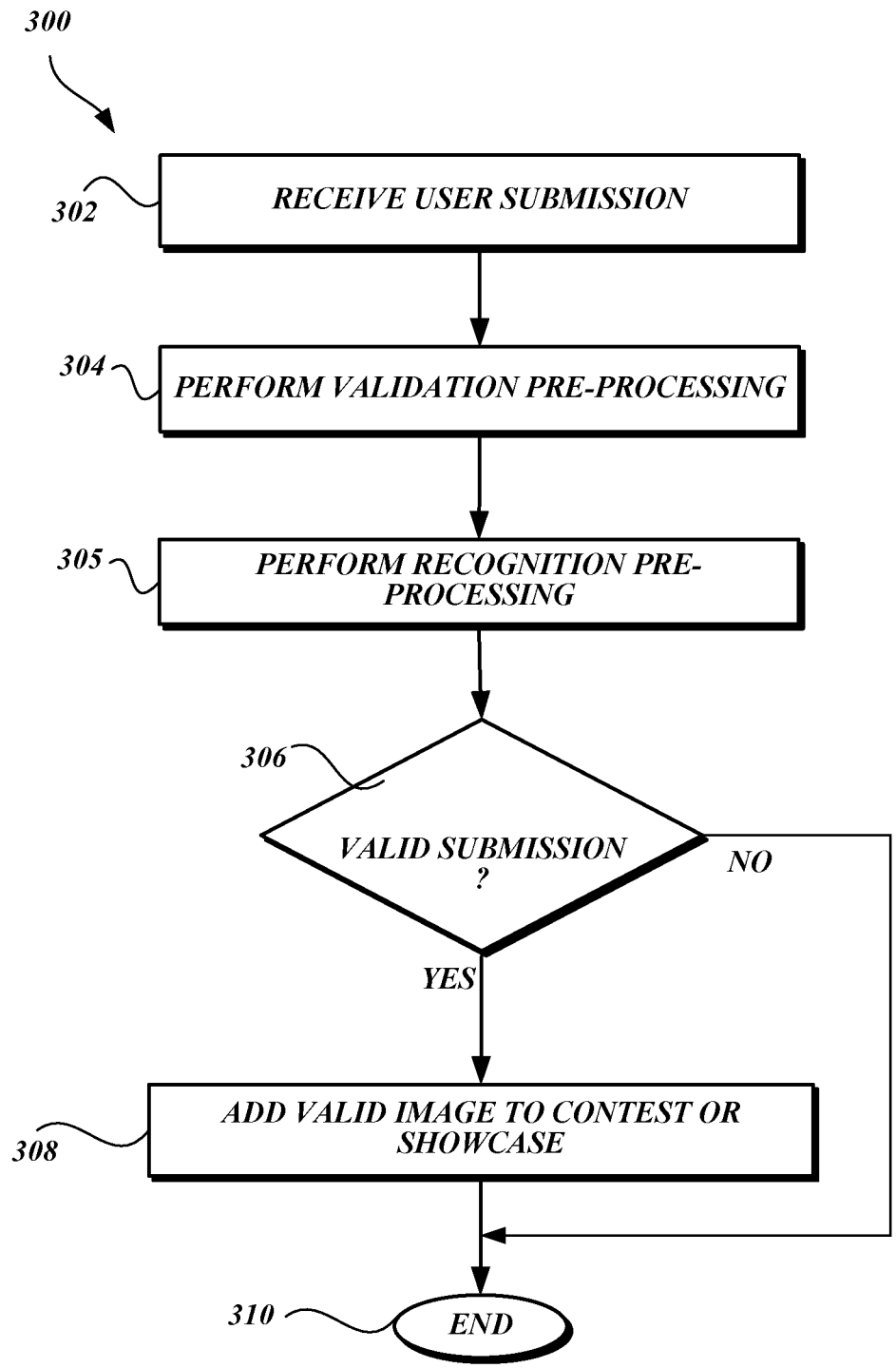
FIG. 3 is a pictorial depiction of an exemplary flow diagram configured to add a submitted image to a contest in accordance with the present disclosure.

As illustrated in FIG. 3, the contest management method 300 begins at step 302 where a user submission is received. In one aspect, the present disclosure provides an application operating on an end-user's computing device (such as the user device 120 illustrated and depicted in FIG. 1). The application is configured with an interface that enables users with the ability to interact with information resources provided by the present invention. For example, through a set of requests/response interactions with an application or web interface provided by the present disclosure, a privileged user may create a new photo contest or showcase. Once the contest or showcase has been created, an end user may select a button or other user interface control in order to enter the contest and upload an image. At step 302, an end user provides an input event to submit an image and compete in a contest.

At step 304 of the contest management method 300 validation pre-processing of a received user submission is performed. As mentioned previously, aspects of the present disclosure enable a user to upload an image for entry into, for example, a photo contest. When a user submits an image, validation pre-processing is performed to ensure compatibility with the contest before acceptance of the entry. In one aspect, this pre-processing includes technical testing of the received image from which a binary positive or negative result can be derived. In this regard, the battery of tests performed at step 304 may include, but is not limited to, processing the received file to determine whether the file is corrupted, scanning the file for malware, determining whether the file contains valid RGB (Red, Green, Blue) values, determining whether the file is an image by confirming that it includes pixel values indicative of multiple colors, comparing the file to a database such as Google images or similar online repository.

In addition to the validation pre-processing, the contest management method 300 also performs recognition pre-processing at step 305. The recognition pre-processing performed at step 305 includes analyzing images in a number of other of ways. For example, the received file is analyzed to identify the technical attributes (color usage, focus, lighting, sharpness, contrast, etc.) of the image. Moreover, the recognition pre-processing performed at step 305 includes applying machine vision systems to identify image content that is typically comprised of "people, places, and things." The identified image content is used in a number of different ways by aspects of the present invention as will be made clearer in the description below. In this regard, contest sponsors may define rules for contest entry that prohibit nudity, brand promotion, and the like. The recognition pre-processing performed, at step 305, includes processing and analyzing image content to ensure compliance with the content rules. Specifically, a submission may not include content that is prohibited by the content rules and submissions are rejected that violate those rules. Additional aspects of the present invention for configuring and applying rules to received submission will be described in further detail below with reference to FIG. 7.

The pre-processing performed, at steps 304-305, is used to determine whether a received entry is a valid image having attributes that satisfy contest requirements or rules. Accordingly, at decision step 306, a determination is made whether a received entry has satisfied the requirements to be a valid entry into a contest or showcase. In the event a "NO" determination is made, at step 306, then the user may be provided with feedback that identifies the one or more requirements that was not satisfied. In some instances, the user interface provided by the present disclosure enables the user to correct an identified problem and subsequently upload a valid submission. Then, the contest management method 300 proceed to step 310, where it terminates.

In the event the result of the test performed at step 306 is "YES", the contest management method 300 proceeds to step 308. Then, processing is performed, at step 308 to add a valid submission to a previously created contest or showcase. As described in further detail below, submissions to a contest may be displayed or otherwise made available from a network-based user interface provided by the present disclosure. In this regard, submitted images may be accessed and viewed by others as will become clearer from the description that follows. Then, the contest management method 300 proceeds to step 310, where it terminates.

Usage of Annotators for Force Ranking a Contest

In some aspects of the present disclosure, systems and/or methods are provided to perform efficient human-originated scoring and ranking of incoming submissions received from multiple sources, and to do these annotations at substantially the same time as submissions are received in a contest or showcase. In this regard, the systems provided by the present disclosure include multiple clients in communication with a server that provides functionality for scoring and ranking images in a way that is accessible by the multiple clients. The incoming submissions may be processed in various ways and routed to the appropriate human-annotators. In turn, the subsequent computer-based scoring and ranking of images is submitted back to the system provided by the present disclosure. In this regard, the routing process enables images and associated data to be remotely distributed from the remotely located clients to the server. As such, the present disclosure provides a distribution service that enables scoring, ranking, and tagging from multiple client annotators within a client/server architecture. In some embodiments, the rankings are constantly updated as new entrants are received by the system. As such, the scoring and ranking of images is typically performed throughout and during the course of the contest, not once all the submissions have been received, due to the potential lag in human processing.

Now with reference to FIG. 4 a force ranking method 400 configured to cause images to be ranked by human annotators in accordance with the present invention will be described. In general, aspects of the force ranking method 400 enables submissions to be ranked against other entrants by humans interacting with the application (hereinafter "human annotators") provided by the present disclosure. In exemplary embodiments, the ranking is performed on a one-to-one or one-to-many basis by human annotators who directly compare images submitted to the contest. In general, the force ranking method 400 may first identify a general ranking of a submission (i.e. $50^{th}$ percentile), then additional comparisons may be performed to identify a more specific ranking. For example, a first one-to-one comparison of an image may be relative to an image that was previously ranked at the $50^{th}$ percentile from all of the received images. If a determination is made that a submission is better than the $50^{th}$ percentile image, then a comparison may be performed with a different image previously ranked at the 25th percentile. These comparisons may continue to be performed until a sufficiently accurate ranking is identified for a specific image.

Figure 4:
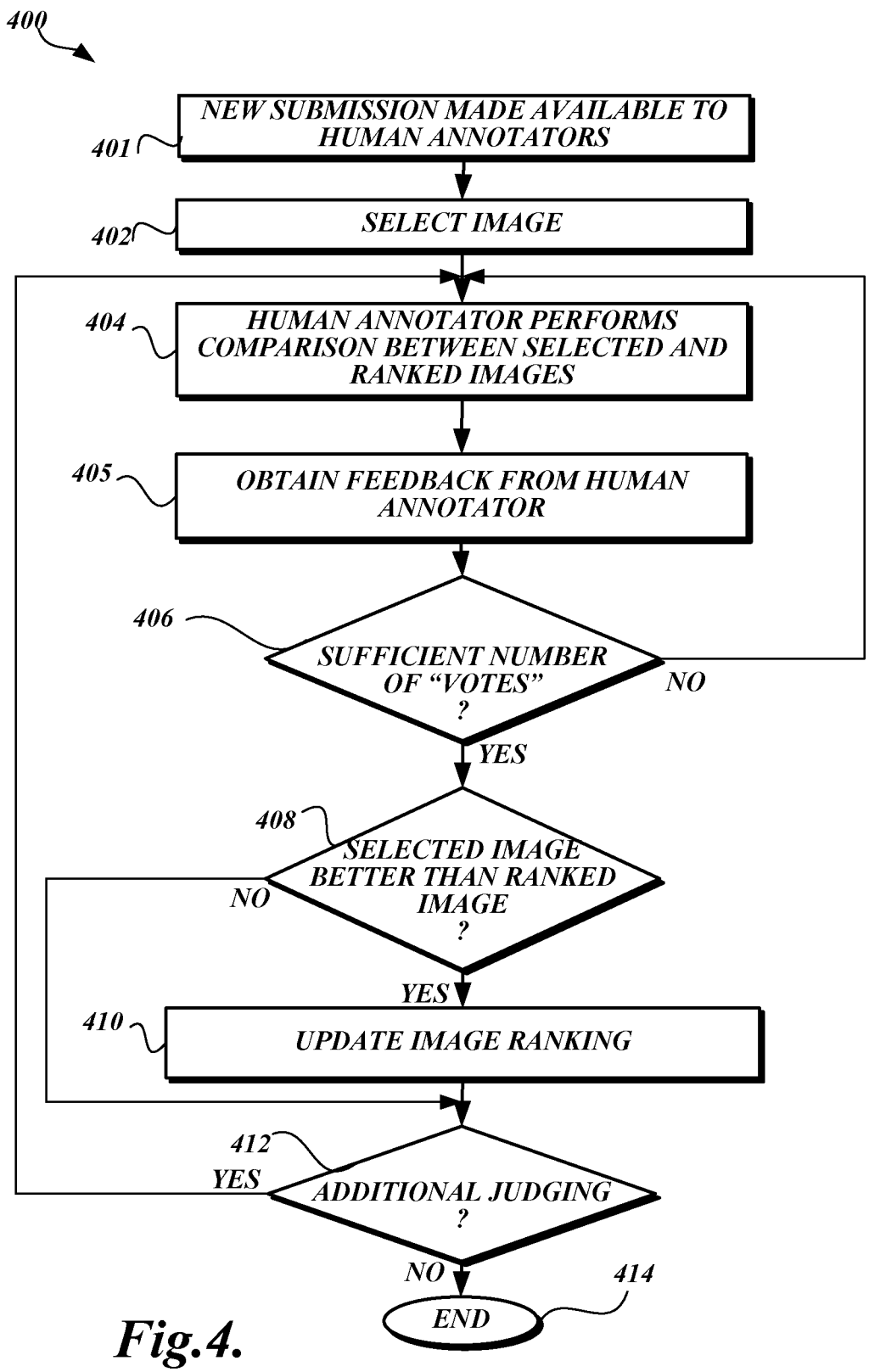
FIG. 4 is a pictorial depiction of an exemplary flow diagram operable to rank a submitted image in accordance with the present disclosure.

As illustrated in FIG. 4, the force ranking method 400 begins at step 401 where a new submission is made available to human annotators for judging relative to other submissions. In some embodiments, human annotators are identified and selected to participate in tagging and ranking images because they are contest sponsors, employees, friends, subject matter experts, or a member of another type of group. In other instances, human annotators are potentially random humans so that the tagging and ranking of images as described herein is effectively "crowd-sourced." Significantly, the present disclosure provides the infrastructure and workflow for assigning tasks to the pool of human annotators. This infrastructure enables explicit ranking and tagging of images to be performed without users needing to have any skill in photography. In this regard, a subset of properly credentialed human annotators may be provided with access to a Web or network-based user interface provided by the present disclosure in order to undertake their judging duties. In judging the contest, a human annotator will typically login at the user interface and access a judging screen associated with a specified contest. Submissions to the contest are typically analyzed by multiple judges that make up a judging pool. The client/server architecture described with reference to FIG. 1 above and the application provided by the present disclosure enables the judging pool to access and analyze images from potentially anywhere. Ranking and tagging information may be communicated between the user and the service provider servers 130 from any number of different client computing devices as described above with reference to FIG. 1.

At step 402 of the method 400, a submitted image is selected for ranking in an exemplary embodiment of the present disclosure. Then, at step 404 of the exemplary force ranking method 400 depicted in FIG. 4, a human annotator performs a comparison between the image selected, at step 402, and a previously ranked image. In this example, image rankings may be performed on a one-to-one basis with a first submission being compared to a second submission by the human annotator. As mentioned previously, the selected image can be compared to an image, that has a known ranking (i.e. $50^{th}$ percentile). In other words, the human annotator effectively "votes" to identify which of the two images being compared, at step 404, is better given the purpose of the contest.

At step 405 of the method 400, feedback may be obtained from the human annotator regarding the reasoning behind their selection of a particular image. In the process of "voting" for an image, the human annotator may be presented with a list of reasons for their selection of one image over another. These reasons or "qualifiers" enable human annotators to choose and potentially associate certain descriptors with a particular image. By way of example, qualifiers that uniquely identify why a human annotator prefers one image over another can include such adjectives as sexy, romance, techie, adrenaline, and the like. One skilled in the art and others will recognize that images may be described in a number of different ways and the examples provided herein should be construed as exemplary. When a significant number of human annotators selects a common qualifier for a particular image, the image file may be "tagged" with that qualifier which is typically represented as file metadata by the present disclosure.

At decision step 406, a determination is made regarding whether the selected image has received a sufficient threshold number of "votes." To ensure statistical significance of the data being generated by the human annotators, the force ranking method 400 may require that a data set of sufficient size has been generated. In some instances, a significant data set may be generated as a result of a sufficiently large pool of human annotators reviewing the image. In addition or alternatively, a significant data set may be generated as a result of multiple rounds of "voting" even if the pool of human annotators used to analyze an image is relatively small. In any event, a certain number of human annotators should have "voted" for the selected image before assigning the selected image a new ranking. This ensures that image rankings accurately reflects the opinions of the human annotators in the aggregate. If the result of the test performed at step 406 is "YES" then the force ranking method 400 proceeds to step 408, described in further detail below. On the other hand, if the result of the test performed at step 408 is "NO" then the force ranking method 400 proceeds back to step 404, and steps 404-406 repeat until a sufficient data set has been generated. In other words, additional human annotators are provided with the opportunity to analyze the selected image until a sufficiently large data set is generated.

At steps 404-406 above, a process is described for performing potentially multiple one-to-one comparisons to narrow in and specifically identify a selected image's ranking. In this exemplary embodiment of the present invention, multiple comparisons may need to be iteratively performed to achieve a sufficiently accurate result. In an alternative embodiment, image rankings are performed on a one-to-many basis where a human annotator may be presented with multiple images for comparison at once. In this instance, the human annotator may be prompted to perform a comparison in which a "best" image from a plurality of images is identified. In addition or alternatively, the human annotator may be prompted to generate an ordering of all of the presented images from best to worst. In either instance, the human annotator performs a one-to-many comparison in ranking a submitted image which may be useful for a number of different reasons. By way of example, one benefit of a one-to-many comparison is that the system may generate a substantial data set in a single pass. As a result, data can be generated in a way that enables the system to arrive at a rough result very efficiently and quickly.

Once an image has received a sufficient number of "votes", the force ranking method 400 proceeds to decision step 408 where a determination is made regarding whether the image selected at step 402 should be ranked at a higher position than the one or more images that it was compared against. In completing the comparisons described above, the human annotator effectively votes for or against a selected image. The processing performed at step 408 identifies a best image between the two or more images using all of the data generated by the human annotators. In the example of a one-to-one comparison, if more than 50% of the human annotators indicate that the image selected at step 402 is better between the two images, then the result of the test performed at step 408 is "YES" and the force ranking method 400 proceeds to step 410 described in further detail below. On the other hand, if the human annotators indicate that the image selected at step 402 is not the better of the two images, then the force ranking method 400 proceed to step 412 also described in further detail below. In other embodiments, identifying image ranking may be performed by generating a multi-dimensional score. In this instance, an image is allocated n dimensions of 'scores' with each of the different dimensions being associated with a qualifier. These qualifiers would be substantially similar to those described with reference to the "PHOTO TAGS" area 504 in FIG. 5 below. An evaluation can then be performed that weights each of the n score dimensions so that an image may be evaluated across certain defined qualifiers to determine rankings.

At step 410, the ranking of the image selected at step 402 is updated to reflect the input received from the human annotators. If step 410 is reached, the ranking of an image within the system needs to be updated to reflect the input received from the human annotators. In this regard, the actions undertaken at step 410 includes updating the ranking of a submission within the contest to reflect the voting undertaken by the human annotators. An exemplary user interface that identifies a submission's ranking in a contest will be provided below in the description that is made with reference to FIG. 5.

At decision step 412, a determination is made as to whether additional judging of the image selected at step 402 should be performed. As mentioned previously, the force ranking method 400 may identify a general ranking of a submission (i.e. $50^{th}$ percentile), than additional comparisons may be performed to identify a more specific ranking. For example, a first one-to-one comparison of an image may be performed relative to an image that was previously ranked at the $50^{th}$ percentile from all of the received images. If a determination is made that a selected image is better than the $50^{th}$ percentile image, then additional comparisons may be performed. In this regard, the selected mage may then be compared to an image previously ranked at the 25th percentile. These comparisons may continue to be performed until a sufficiently accurate ranking is identified for a specific image. Similarly, a one-to-many comparison may be performed with a selected image being compared relative to images previously ranked at different percentiles. These comparisons may also continue to be performed using the pool of human annotators until a sufficiently accurate ranking is identified for a specific image. In these instances when the result of the test performed at step 412 is "YES" and additional judging may be performed, the method 400 proceeds back to step 404 and steps 404-412 repeat until a sufficiently accurate ranking is identified.

There are a number of instances in which aspects of the present disclosure will determine that judging of a particular image in the contest should cease. In some instances, additional comparisons may not need to be performed as determining that the submitted image is worse than the $50^{th}$ percentile image may be sufficient to decide, for example, that the submitted image will not be a contest winner. In this regard, a number of optimizations may be implemented to minimize the effort that needs to be expended by the human annotators or others in managing the contest. Moreover, aspects of the present disclosure may provide compensation or other reward to the human annotators in judging the contest. In instances when the rewards provided to the human annotators is scarce or otherwise needs to be preserved, the system may determine that judging activities needs to cease or be minimized given the ranking of an image. In instances when the system determines that additional judging is not necessary, the result of the test performed at step 412 is "NO" and the force ranking method 400 proceeds to step 414 where it terminates.

It should be well understood that the methods described above with reference to FIGS. 3-4 do not show all of the functions performed within the computing environment 100 depicted in FIG. 1. Instead, those skilled in the art and others will recognize that some functions or steps described above may be performed in a different order, omitted/added, or otherwise varied without departing from the scope of the claimed subject matter. For example, FIG. 4 above describes a process in which human annotators are utilized in analyzing, ranking, and tagging images. In other embodiments of the present disclosure, artificial intelligence systems are utilized to perform the same or substantially similar steps as those described in FIG. 4. In these instances, data sets that describe image attributes may initially be generated by human annotators. From this data, the importance of variables and relationship dependencies in recognizing certain image attributes can be identified and used to generate an artificial intelligence ("AI") model. With a defined model for processing and identifying attributes in images, the AI system can begin performing some or all the tasks previously performed by the human annotators.

Revenue-Controlled Force Ranking Process

As mentioned previously above, a number of optimizations may be implemented to manage costs and minimize the effort that needs to be expended by the human annotators. The system provided by the present disclosure may have various revenue sources and costs associated with the submission and ranking of images as described above with reference to FIG. 4. For example, human annotators may be compensated to score and rank images. When a collection of items is submitted for a forced ranking analysis, aspects of the present disclosure provides functionality to control financial variables related to the forced ranking process. More generally, the present disclosure is concerned with two primary variables: profit and costs. Functionality is provided to adjust the intended profit per entry dynamically for each contest. In this regard, the expense variable optionally consists of a number of factors including transaction expense, donation expense, technical expense, and processing expense. In the expense category, the processing expense is heavily monitored in conjunction with the actual ranking of submissions. Depending on a configurable variable, submissions may cease to have new judgements placed on their ranking. In so doing, the present disclosure conserves resources and money spent for submissions that are clearly not able to win the contest. Instead, funding is conserved for analyzing and scoring high-ranking submissions.

Figure 5:
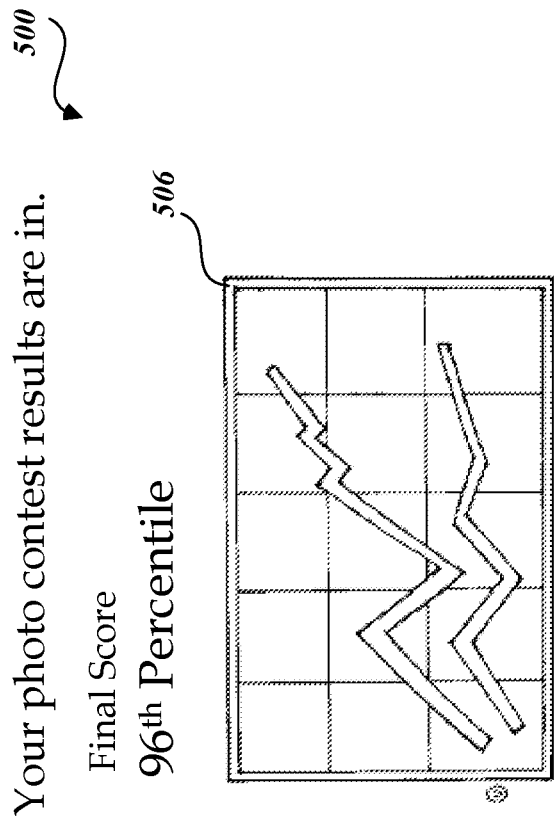
FIG. 5 is a pictorial depiction of an exemplary user interface operable to convey force ranking information to a user in accordance with the present disclosure.
Figure 5:
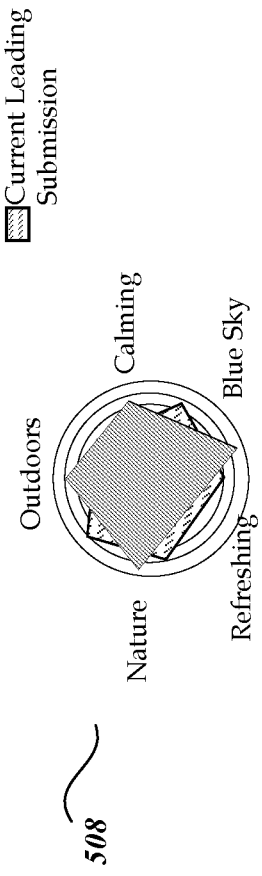
Figure 5:
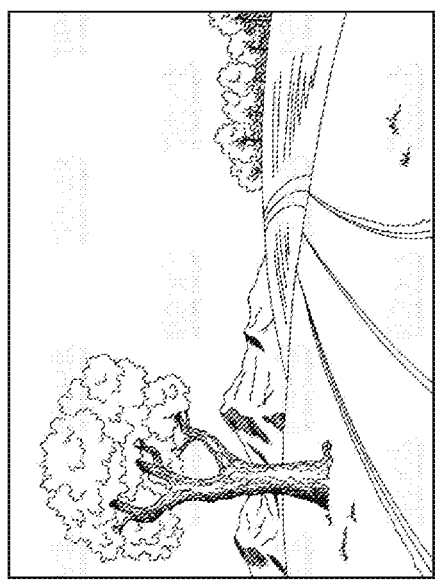
Figure 5:
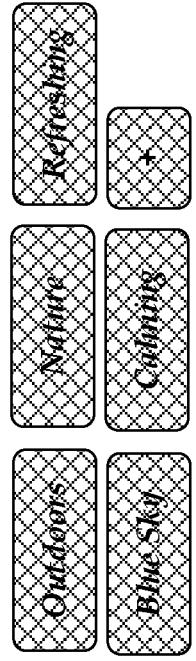

Now with reference to FIG. 5, one exemplary graphical user interface is shown with user interface elements suitable for illustrating various aspects of the present disclosure. In the exemplary embodiment depicted in FIG. 5, an image ranking screen 500 is displayed that includes a "PHOTO THEMES" area 502, the "PHOTO TAGS" area 504, the Line Graph Area 506, and the Spider Graph Area 508. In general, the user interface elements utilized by the present application such as those depicted in FIG. 5 provide convenient ways of interacting with and providing information to the user. In addition, controls are provided that enables the system to obtain input and generate robust information-packed metadata that can be used for artificial intelligence and marketing purposes.

As mentioned previously, systems and/or methods are provided to perform efficient human-enhanced ranking and tagging of incoming submissions received from multiple sources, and to do these annotations at substantially the same time as submissions are received. In this regard, the scoring and ranking of images can be accessed by appropriate users. From the user interface provided by the present disclosure, users can track their performance in a contest or showcase. As shown in FIG. 5, a user that entered a submission in a contest can follow the ranking of the photo, on an on-going basis. In this regard, information is provided on the ranking screen 500 in the Line Graph Area 506 which, in this example, compares the submission's ranking over time to an average winning photo. In other examples, a user's submission may be compared to other types of images such as the highest scoring image to date, the historically best photo, average top ten photo, a user's best or most recent image etc., and combinations thereof. Significantly, the present application implements a workflow of ranking, analysis, and tagging of images that is performed in real-time so that this and other types of robust data may be generated on demand.

As described previously with reference to FIGS. 3-4, robust metadata that describes a submitted image may be generated and used in various ways by aspects of the present disclosure. In some instances, the metadata is generated by machine visions systems which analyze an image to identify image content that is typically comprised of people, places, and things (see step 305 of FIG. 3). In other instances, the metadata is generated by human annotators or AI systems which reflect human (or modeled) perceptions of an image. These qualifiers can be virtually anything that is suitable for describing an image. In the example, depicted in FIG. 5, the "PHOTO TAGS" area 504 presents a plurality of qualifiers that have been associated with the displayed image. In this example, the qualifiers include the terms "Outdoors," "Nature," "Refreshing," "Blue Sky," and "Calming." One skilled in the art and others will recognize that images may be described in a number of different ways and the examples provided herein should be construed as exemplary. Significantly, the qualifiers implemented by the present disclosure extend beyond just image qualities and can be virtually anything including, but not limited to, emotional assessments (relaxing, calming), adjectives (hot, fast, sexy), nouns (sunshine, outdoor, nature), verbs (refresh, motivate), etc. Moreover, qualifiers are configurable so that sponsors or others can define contests in which images having specific defined qualities can be identified and rewarded. In this regard, human annotators or artificial intelligence systems may be prompted to judge a competition with regard to how well a submitted image matches a particular qualifier.

Accordingly, the present disclosure enables new types of competitions to be conducted in which images that best match a particular quality of interest are identified. One skilled in the art and others will recognize that other information may be provided to the user or displayed and feedback obtained in different ways than shown in FIG. 5 without departing from the scope of the claimed subject matter.

Predictive Machine Learning

Figure 6:
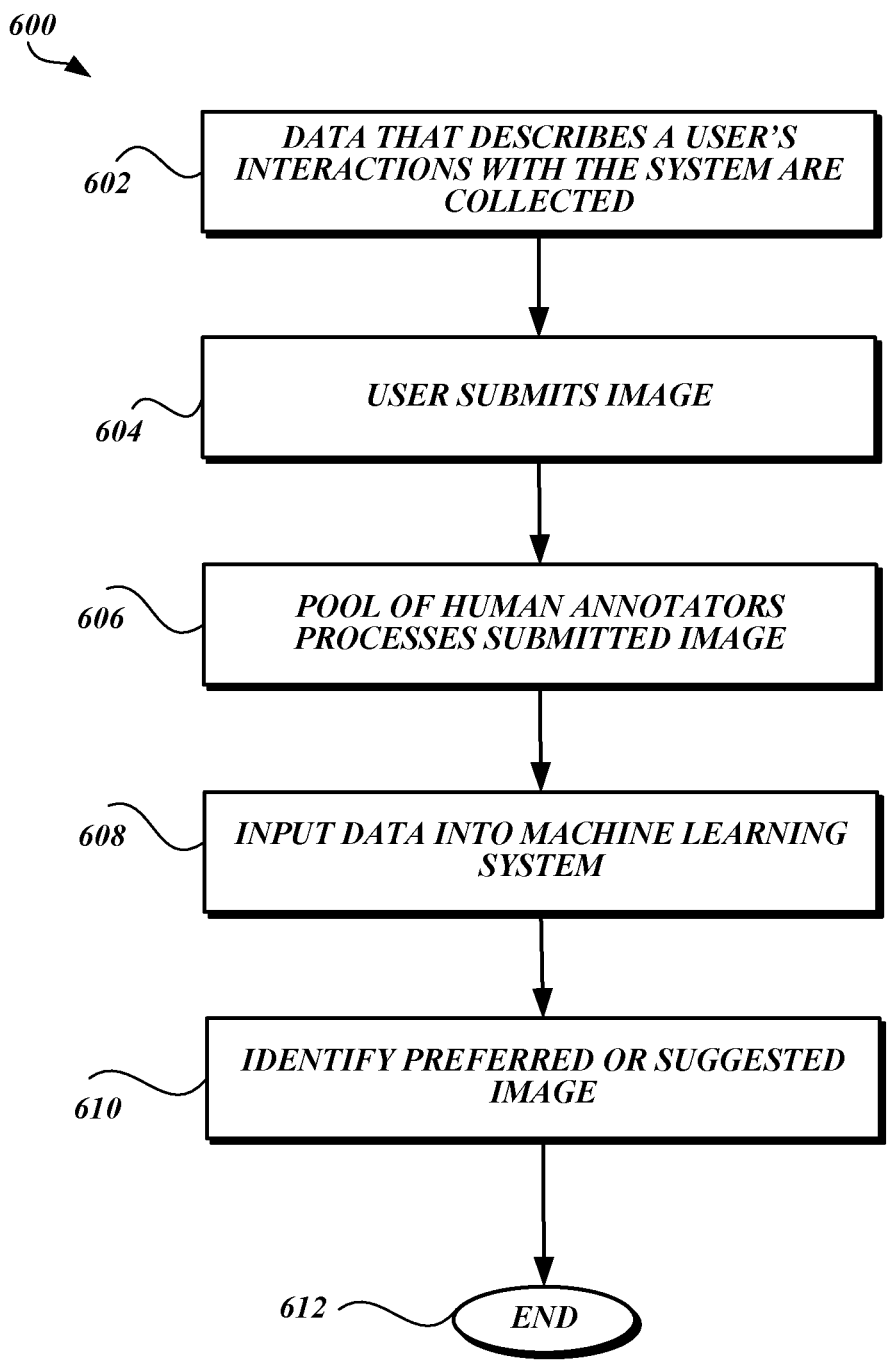
FIG. 6 is a pictorial depiction of an exemplary flow diagram for identifying a preferred image given data generated by the system in accordance with the present disclosure.

Now with reference to FIG. 6 a selection method 600 configured to identify preferred images for particular users in accordance with the present invention will be described. As illustrated in FIG. 6, the selection method 600 begins at step 602 where a set of data that describes a user's interactions with the system provided by the present disclosure is generated and collected. As mentioned previously, the present invention provides an application that may be installed on a user's device. Once installed, the application is able to access and collect a set of profile data about the user that may include, but is not limited to, age, location, gender, etc. This and other types of data about the user may be identified using a cookie, and/or digital certificates. In addition, a user may provide profile data in a set up process when establishing an account with the application provided by the present invention. By interacting with the application provided by the present disclosure, the user generates additional types of data that gives insights into their tastes and preferences. For example, a user may upload images depicting particular subject matter for entry into one or more contests. These images are potentially analyzed in various ways and tagged accordingly. At least some of a user's interests and tastes may be derived from the image content that has been uploaded. In addition, a user interacts with the system provided by the present disclosure in a number of other ways. Users search for, access, and purchase rights to images having particular subject matter using keyword searches. In this regard, the user's interactions with the system provided by the present disclosure as described herein is continually tracked and memorialized. In these interactions, a robust set of data that reflects a user's attributes, tastes, and preferences is generated and collected, at step 602. It should be noted that the data is collected not only from end users but also from human annotators that process images in various ways.

Then, at step 604 of the selection method 600, an image is submitted to the application provided by the present disclosure. This aspect of the present invention in which users are able to submit images to a contest or showcase is described above with reference to FIG. 3 and will not be repeated here. However, it should be noted that once an image is submitted, pre-processing is performed to determine whether the image is a valid submission (steps 304-305 of the contest method 300 described above in FIG. 3). As part of the pre-processing steps, the present invention applies machine vision systems to identify image content that is typically comprised of "people, places, and things." In one aspect, image content may be used to determine which images are preferred given what is known about a particular user.

At step 606 of the selection method 600, a pool of annotators or AI system processes the image submitted at step 604. In the event of a contest, one way in which the annotators process an image is described above with reference to FIG. 4. Specifically, the submitted image may undergo the force ranking method 400 in which human annotators may compare images relative to each other to identify a contest winner. Since this aspect of the present invention is described above with reference to FIG. 4, it will not be repeated here. However, as part of the process of force ranking images, human annotators may process the submitted image in ways that generates semantic context. As mentioned previously, human annotators may be presented with a list of reasons for a selection when comparing images during the force ranking process. By making these selections, the human annotators are able to choose and potentially associate certain descriptors with a particular image. In the "PHOTO TAGS" area 504 and Spider Graph Area 508 depicted in FIG. 5, exemplary descriptors that may be associated with an image by human annotators are provided.

At step 608 of the selection method 600, data that describes a set of images is input into a machine learning system. One skilled in the art will recognize that a machine learning system is one in which a computer system is not programmed to solve a desired task directly. Instead, the machine learning paradigm can be viewed as "programming by example" in which methods are implemented so that the computer system will adjust its own program based on provided examples. As images are analyzed in the various ways described herein, the generated data is fed into the machine learning system. This content and contextual data serves as the training set for the machine learning system. In turn, the machine learning system builds a model of preferred images that accounts for the attributes and preferences collected from users including the human annotators. From this data, the importance of variables and relationship dependencies in recognizing preferred images can be identified and used to define and refine the AI model.

At step 610 of the selection method 600, a preferred or suggested image is identified potentially using the identified preferences of one or more users. As mentioned above, a user's interactions with the system provided by the present disclosure is continually tracked and memorialized. From these interactions a robust set of data that reflects users attributes, tastes, and preferences is known. With this information, the system is able to determine which images are preferred, not generically, but based on data generated from users interactions with the system. Specifically, the AI model built at step 608 of the selection method 600 can identify images which possess the descriptors or other semantic data that has been identified as being preferred. These preferred images may be further filtered to account for what is known about a specific user or group. For example, content identified as being in an image (animals, people, art, food, etc.) may be used to determine which images are preferred given how a user or group has interacted with the system. More generally, the system generates a vast amount of data that describes aspects of each submitted image. To identify images that are the most relevant, this data may or may not be filtered relative to a particular user's identified range of tastes and preferences. Then, the selection method 600 proceeds to step 612, where it terminates.

It should be well understood that the methods described above with reference to FIG. 6 do not show all of the functions performed within the computing environment 100 depicted in FIG. 1. Instead, those skilled in the art and others will recognize that some functions or steps described above may be performed in a different order, omitted/added, or otherwise varied without departing from the scope of the claimed subject matter.

The description provided above with reference to FIGS. 1-6 illustrates processes in which "human annotators" are utilized in analyzing, ranking, and tagging images. However, a computer system may be configured to perform the same or substantially similar functions as those described above by, for example, utilizing a machine learning system to identify the importance of variables and relationship dependencies to learn and implement processes previously done by humans. As used herein, the term "annotator" refers to either a human or computing devices that performs some or all the tasks in processing images and managing a contest that are described herein.

Configurable Contest Criteria

As mentioned previously aspects of the present disclosure enable contests and showcases to be defined that have configurable contest criteria. In this regard, contest criteria may be defined so users can submit a specified number of total images (i.e. three) to a contest. A submitted image may be assigned a score based on an assessment of the image's satisfaction of certain criteria, as described above. Also, an image may be scored in other ways or scored based on overall ranking against other submissions. In this instance, the user with the highest total ranking over their set of submissions may be declared the winner. The configurable criteria may also be used to define team competitions where scores are computed for each individual participant in a team. In this regard, the sum of individual scores assigned to a user's submissions can be used to identify the winner of the team competition. In alternative embodiments, an algorithm provided by aspects of the present disclosure weighs or normalizes individual scores. In normalizing the individual team member scores and summing these values certain skew may be accounted for to, for example, produce results that are size-invariant.

In some embodiments, the contest or showcase imposes certain geographic and/or other types of restrictions on user submissions. In this regard, one exemplary embodiment of a geo-code application method 700 that enables a photo contest or showcase to be customized in various ways will now be described with reference to FIG. 7.

Figure 7:
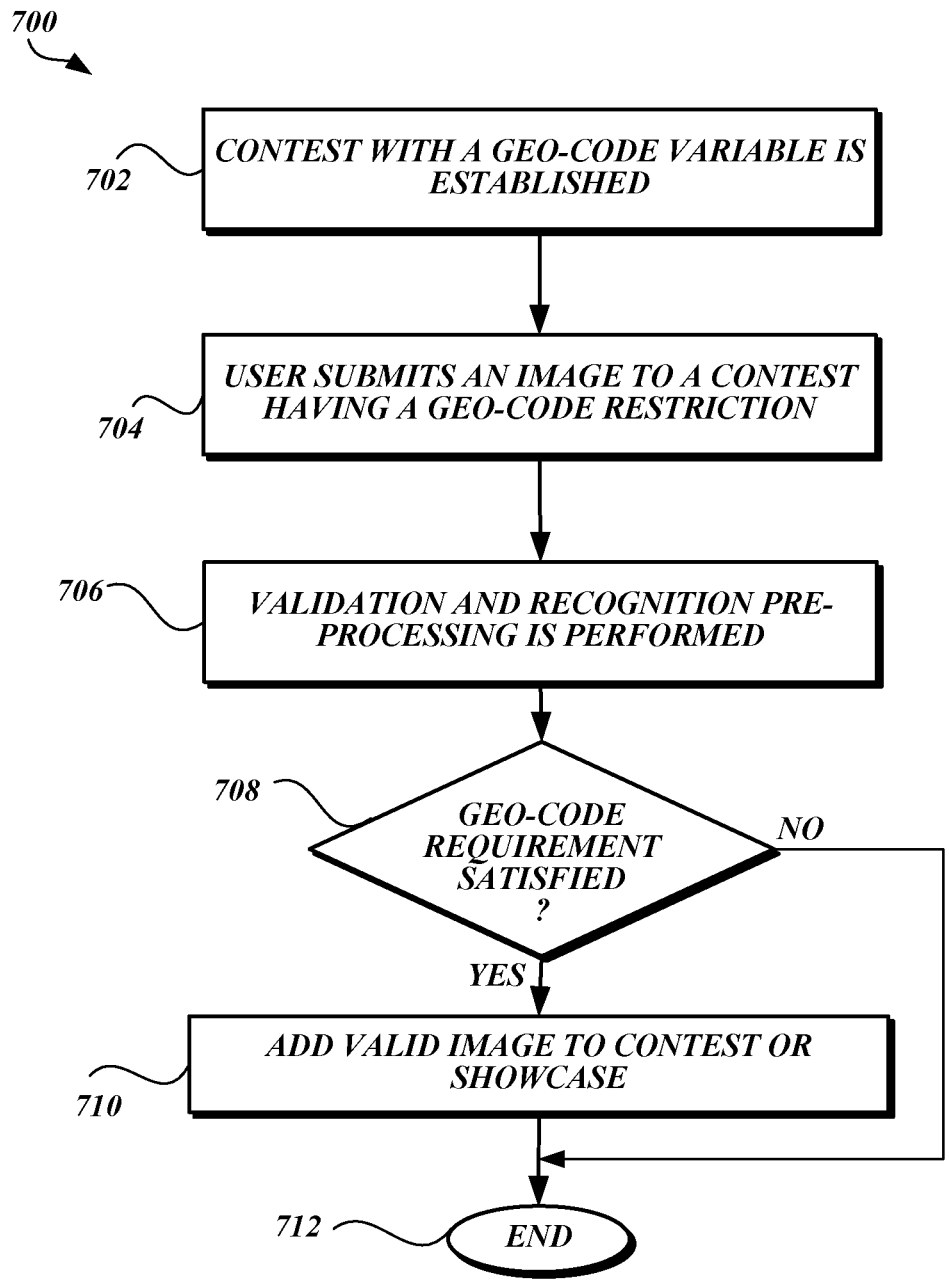
FIG. 7 is a pictorial depiction of an exemplary flow diagram that determines whether a submitted image satisfies a geographic constraint in accordance with the present disclosure.

As shown in FIG. 7, the geo-code application method 700 begins at block 702, where a contest or showcase having a geo-code variable is established. As mentioned previously, the present disclosure provides an application operating on an end-user's computing device (such as the user device 120 illustrated and depicted in FIG. 1). The application is configured with an interface that enables users to interact with information resources. For example, through a set of requests/response interactions, a privileged user may create a new photo contest or showcase. Significantly, a user having the appropriate credentials is able to create a contest where submissions are restricted by geographic location, among other ways. Stated differently, a contest or showcase may be defined that only accepts images as valid submissions which satisfy certain geographic constraints such as proximity to a particular location or landmark. To this end, the web or application interface provided by the present disclosure enables a user to establish these criteria, at block 702.

At block 704, a user submits an image to a contest or showcase that is associated with a geo-code restriction. Once a contest or showcase has been created, an end user may select a button or other user interface control to submit an image. In this regard, the application provided by the present disclosure enables users to attach their own metadata to images. This metadata may be included in the user submission received at block 704 and supplemented as described herein. Since image submission is described above with reference to FIG. 3 at block 302, a detailed description of this aspect of the present disclosure will not be repeated here. However, the application provided by the present disclosure is able to access a rich set of data from a user device that may also be submitted along with the image, at block 704. As one skilled in the art will recognize, modern computing systems (such as mobile phones) are typically configured with a Global Position Systems ("GPS") or similar type of location/navigation system. These systems enable applications to access the location of a particular user at any time. Along with an image, aspects of the present disclosure may also obtain GPS data having the spatial coordinates that identify where an image was captured, at block 704.

At block 706 of the method 700, validation and recognition pre-processing is performed on the image being submitted at block 704. Since a detailed description of validation and recognition preprocessing that is performed on a submitted image is described above with reference to FIG. 3 at blocks 304-306, that description will not be repeated here. However, as part of the pre-processing process or otherwise, the present disclosure is configured to access and process geo-code data from the received image. As used herein, the term "geo-code" refers to the process of translating a set of coordinates which may be captured using GPS to a location, usually the name of a place or an addressable entity. In this regard, the geo-coding process may involve a set of interrelated components in the form of operations, algorithms, and data sources that work together to translate a spatial representation to descriptive locational reference.

The geocode and/or GPS data obtained at block 706 of the method 700 may be used in a number of different ways by aspects of the present invention. As mentioned previously, contest sponsors may define rules for submitting an image. The pre-processing performed, at step 706, may include processing a submission to ensure compliance with the content rules. In this regard, submission of an image may require a phone or other user device to geo-tag a submission, and the geographic information be present to satisfy geographic constraints of a specific location. In this regard, the location as identified in the geo-tag may be indicated with a center point, as well as a radius. The geotag may also identify some well-known, predefined, or describable location ("Key Arena", "Any Nordstrom location", "Within 30 miles of mile post 155 on I-5", "Anywhere in Washington State", "In a state park", "Any outdoor location", "Tahoma High School", "Within a 5-minute walk of Town Square", "Line of sight to the Space Needle", "Within hearing range of Pike Place Market"). In addition, visual elements in the image may also be used to confirm that the image is submitted from the desired location. For example, an image with the geographic restriction of "line of sight to the Space Needle" may require the Space Needle to be present in the image. In still other embodiments, a geo-code may be employed to create a user group, restrict image submissions, and/or amplify voting in a contest or showcase. In this regard, group members (identified through an access code, password, URL, and the like) would be able to submit an image meeting geographic constrains of the contest. Moreover, certain other criteria may be established in combination with each other. For example, users may be required to submit a photo from a specific location and/or within a defined time window. An alert message may be communicated to the user that states: "Send us a photo from the Jimmy Buffet concert tonight." By way of another example, the alert message may state: "We need a photo from the Seattle Nordstrom's, between 8:45 PM and 9:30 PM tonight." In this regard, the time could be a single event (date/time), or it may be over multiple time(s) an day(s). By way of another example, one or more alert messages may be communicated to the user that the specified image may be taken or submitted: "Any Sunday in the next 3 weeks" or "Evenings for the next 33 days."

The pre-processing performed, at step 706 is used to determine whether a received entry satisfies contest requirements or rules. Accordingly, at decision step 708, a determination is made whether a received entry has satisfied geo-code requirements to be a valid entry into a contest or showcase. In the event a "NO" determination is made, at step 708, then the user may be provided with feedback that identifies the one or more requirements that was not satisfied. In some instances, the user interface provided by the present disclosure enables the user to correct an identified problem and subsequently upload a valid submission. Then, the method 700 proceed to step 712, where it terminates.

In the event the result of the test performed at step 708 is "YES", the method 700 proceeds to step 710. Then, processing is performed, at step 710 to add a valid submission to a previously created contest or showcase. Since a detailed description the processing performed to add a submission to a contest or showcase is described above with reference to FIG. 3 at block 308, that description will not be repeated here. Finally, the method 700 proceeds to step 712, where it terminates.

It should be well understood that the annotators and/or machine learning may be employed to further refine whether submissions to a contest or showcase are valid. Specifically, the application of certain rules may not be initially susceptible to recognition processing. In the example provided above, a rule is established such that a valid submission requires a specific landmark (i.e. the Space Needle) to be represented in a valid submission. The processing of location data and geo-tag information may identify that an image was not captured in the vicinity of the specified landmark. In this instance, a determination may be readily made by the method 700 (FIG. 7) that the image does not contain the specified landmark without any further processing. However, the present disclosure also provides an architecture for routing submissions to annotators in a networking environment. As part of the force ranking process described above with reference to FIG. 4, an annotator may be prompted to determine whether a submission being analyzed satisfies a particular rule of the contest or showcase ("Is the Space Needle in the image?). In this instance, the annotator may determine that a received submission does not satisfy a contest rule so that the submission is eliminated from consideration. In this regard, the application provided by the present disclosure enables annotators to attach their own metadata tags to images. In this specific scenario, the metadata tag attached to the image by the annotator may indicate that the image does not satisfy the rules of a contest. More generally, the metadata attached to an image by an annotator may include a number of different things such as adjectives that identifies the annotator's feelings about an image such as, but not limited to sexy, romantic, techie, adrenaline, techie, and the like. In addition, metadata attached to an image may also include the identity of the annotator which enables the present disclosure to evaluate the ability of the annotator to properly identify, annotate, classify, and rank images as described in further detail below with reference to FIG. 8.

In various embodiments, certain other criteria, restrictions, and/or constraints may be placed on submissions in a contest or showcase. For example, a criterion may be defined such that "photos submitted to the contest in the next thirty (30) minutes will receive 30–k points, where k is the elapsed minutes after initiation of the contest. In other words, thirty (30) points may be allocated to an image if the image is submitted in the first minute, twenty-nine (29) points if submitted in the second minute, twenty-eight (28) points if submitted in the third minute, and the like. More generally, a submission may be allocated points based on the timing of the submission in a number of different ways. By way of another example, a submission may be allocated "five (5) points if received in the next fifteen (15) minutes, ten (10) points between fifteen (15) minutes to one hour, and two points after one hour." Also, the contest may also employ secret time-to-submission scoring such that the algorithm employed is not disclosed but the rating is at least partially based on submission time.

In yet another embodiment, a contest about a specific topic of interest is enabled. For example, the contest may be a 'duel' about a specified topic such as cats versus dogs, democrats versus republicans, and the like. In this instance, a winner may be identified and an average score across each side is used to "settle" the duel. Submissions may require users to submit images across two or more topics, typically "A vs. B", with images that satisfy both A and B. In other instances, the contest involves triplicate topics "A vs. B vs. C", or other sets of topics. A contest may be between individual users. In addition, the system enables groups to be formed through the sharing an access 'token' which may be a promo code or other textual value that identifies membership. Alternately, the system may identify the group through a password or a URL (Uniform Resource Locator) shared only with group members.

In yet another embodiment, a user or a group of users are incentivized to submit images and participate in a contest involving a specified topic. By way of example, a request may be submitted for images showing "office teamwork" that could be communicated to users via an "all call" request. Companies or other entities could request photos with certain constraints or topics ("office teamwork"), and then aspects of the present disclosure communicates the request for submissions relevant to that topic. Similarly, a contest creator or other entity may request images associated with certain emotions (happy, melancholy, etc.), perceptions (sexy, techie, risky, etc.), and/or feelings. One or more alert messages may be proactively communicated to notify (email, SMS, etc.) users of the request. In addition, a contest with certain incentives may be formed around the request having certain specified requirements that is hosted by the present disclosure.

In various embodiments of the present disclosure described herein, annotators are employed to annotate images for the purpose of determining whether those images satisfy the rules of a contest or showcase. However, the annotators may be used to process a corpus of images without respect to whether these images satisfy the requirements of a contest or showcase. For example, aspect of the present disclosure may be employed to identify a set of "stock" images that are potentially of interest to advertisers or other licensees. Not only do images suitable for being offered as stock images need to be identified but each stock image should be classified so that meaningful searches may be performed. These stock images may be classified in various ways such as by industry, purpose, message, etc. In this regard, annotators can be applied in the various processes described herein to identify, weigh, and tag a large corpus of submitted images, in various way. One skilled in the art and others will recognize that the system described herein provides efficient ways of tagging images with metadata supplied by humans or machine learning systems. This metadata may be applied without respect to identifying to ranking images in conducting a contest.

Identifying Annotators

Judging information that has subjectively perceived attributes or characteristics is difficult. When the information is one or more images, judging is complicated by the widely varying subjective perceptions of images by different annotators. One annotator may perceive a particular image as being "hauntingly beautiful" whereas another may perceive the same image as just being "haunting." In a distributed networking system involving a large number of users it would be beneficial to identify annotators that are best at judging the quality of submitted images. It would further be beneficial to incentivize or reward high-quality annotators to participate in certain contests or showcases.

In some embodiments, high-quality annotators are identified and incentivized to serve as judges for a contest or showcase. In this regard, one exemplary embodiment of a method 800 that identifies and incentivizes high-quality annotators will now be described with reference to FIG. 8.

Figure 8:
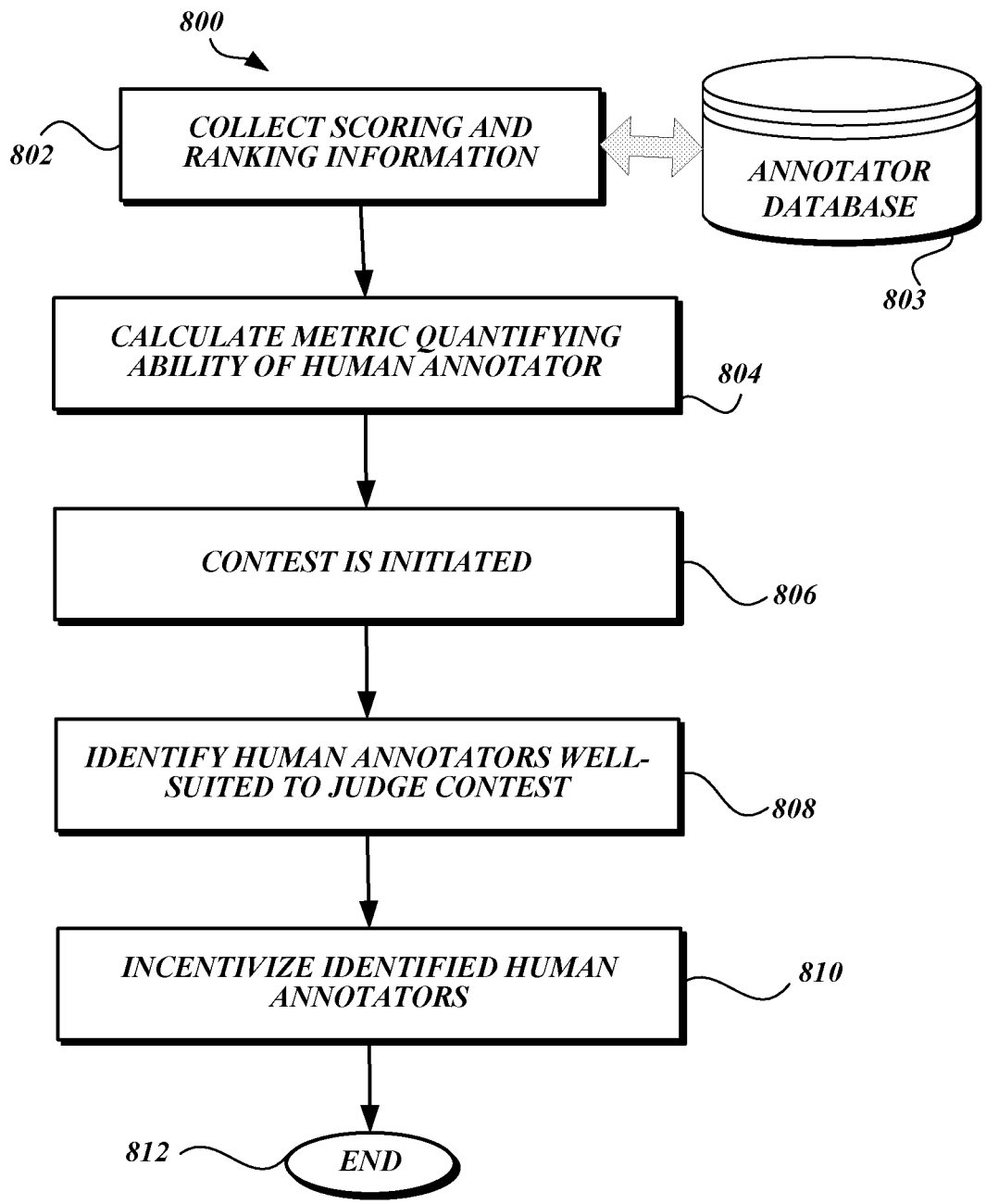
FIG. 8 is a pictorial depiction of an exemplary flow diagram for identifying an annotator suited to judge one or more images submitted to a contest in accordance with the present disclosure.

As shown in FIG. 8, the method 800 begins at block 802, where the system provided by the present invention collects ranking information across a plurality of contests and/or showcases. As described above with reference to FIG. 4, images submitted to a contest or showcase may be routed to a plurality of annotators. In turn, the annotators perform a number of tasks which may include scoring and ranking submitted images. This data generated by the annotators may then be reported back to the system provided by the present disclosure and stored in the annotator database 803 as depicted in FIG. 8. In this regard, the annotator database 803 may contain an annotators' scoring and ranking activities across all of the contests or showcases in which they have participated. While a database is illustrated in FIG. 8, one skilled in the art will recognize that other types of storage systems may be utilized without departing from the scope of the claimed subject matter. For example, non-SQL style databases and or cloud-based blob storage systems, among others, may be utilized by aspects of the present disclosure and that the embodiment depicted in FIG. 8 should be construed as exemplary.

At block 804 of the method 800, a metric that quantifies the ability or skill of an annotator to judge image quality is calculated. This metric which quantifies an annotator's ability to serve as a judge may be calculated in a number of different ways. In one embodiment, the annotator's ability to pick winners of previous contests serves as a strong indicator that the annotator will be able to do the same in future contests and is weighted heavily. However, the metric calculated at block 804 may take into account other factors, alone or in combination, with the annotator's past performance. In this regard, the adherence to mainstream principles may be quantified and used as a factor in assessing the ability of an annotator. Similarly, the annotator's closeness to an aggregate rating over a group of other similar users may be factored into the calculation performed at block 804. In addition, the ability to identify and rank images having a desired criteria may be quantified and used as a factor in assessing the ability of an annotator.

At block 806 of the method 800, a new contest or showcase in which users may submit images is initiated. Since the process of initiating a new contest or showcase and ranking submitted images is provided in detail above with reference to FIGS. 3-4, that description will not be repeated here. However, it should be well understood that annotators may perform judging duties for various types of contests or showcases. Some contests or showcases may request images that visually depict a particular topic or subject matter.

Others may place certain constraints or requirements on the contest that should be assessed by the annotator.

At block 808 of the method 800, one or more annotators that will be incentivized to participate in the contest or showcase are identified. In some embodiments, annotators are selected, at block 808, because they have been identified as being good at assessing image quality. The calculation performed at block 804 that quantifies the ability or skill of an annotator to judge image quality is typically used at block 808. In this regard, annotators associated with high quality metrics are more-likely to be invited or otherwise incentivized to participate in the contest.

In additional aspects of the present disclosure, the opinions of "high-quality" annotators are obtained and used in various ways beyond conducting a contest or showcase. As described above with reference to FIG. 6, annotators generate a set of contextual data when analyzing images. In this regard, opinions and data generated by high quality annotators is better-suited to serve as the training set for the machine learning system. By using a high quality training set, the machine learning system builds a model of preferred images that accounts for the attributes and preferences collected from annotators identified as being the best. Moreover, training sets collected from annotators are also used to differentiate between demographic perceptions of the images submitted to the system. For example, a training set may be collected from a specific demographic (i.e. women who live in the southern United States who prefer images of cats) for the purpose of training the machine learning system to identify images that have qualities of this demographic.

At block 810 of the method 800, annotators are incentivized to participate in the contest or showcase initiated at block 806. As mentioned previously, annotators are able to earn tokens or other forms of compensation in judging submitted images. In this regard, annotators identified as being better in judging image quality as reflected in their metric scores can be compensated with more tokens or accelerated payouts. In addition, payouts may increase if a user consistently shows 'better ratings' in that the user's ratings match the quality of an image in some desired criteria. In this instance, the system identifies the user as one who is more likely than average to pick winners according to the constraints set out for the contest. In addition, the incentives being offered may be communicated to the user. For example, an alert message may be communicated to the user stating: "Come back tomorrow, judge a photo, and get a token boost." In addition, tokens may be provided for extended participation. In this instance, an alert message may be communicated to the user stating: "Earn one token for the first day, two tokens if you judge two days in a row, three tokens for three days in a row, and four tokens for more than three days up to ten days in a row." Then the method 800, proceeds to block 812, where it terminates.

The method 800 described with reference to FIG. 8 discloses a system in which users are "incentivized" to serve as an annotator. In additional embodiments, users may be required to perform useful work which may include serving as an annotator. For example, a user may be required to judge one or more submitted images before being allowed to submit their contest entry. In this regard, the work performed by the user may include, but is not limited to, identifying a "best" image in a set, ranking images in a set, selecting images that satisfy certain criteria such as a geo-code constraint ("pick the images below that show mountains", "pick the best image", "pick the image with the most colors", "pick the image closest to Tahoma High School", etc.). In addition, the work performed by the user may include classifying areas of an image ("find people"), annotating with text in a way that describes objects ("ducks, water, sun"), and the like. The work performed by a user may also include performing some task unrelated to an image or contest. By way of example, the work performed may include answering a questionnaire, taking a survey, supplying personal information, annotating an image, watching a video/advertisement, or performing other task that is part of a workflow, and the like.

In one aspect, the present disclosure manages multiple layers of showcases or contests having content that is related in some way. Various types of contests or showcases may be created and managed by aspects of the present disclosure. Many examples have been provided herein. In this regard, one contest may enforce specified requirements or involve certain topics of interest. Another may enforce a different but related requirement or topic of interest. To further engage a user base, aspects of the present disclosure provides functionality to manage multi-level contests and showcases in which the most impactful images are identified from previously conducted contests and showcases.

Now with reference to FIG. 9, one embodiment of a system 900 comprised of multi-level showcases and/or contests will now be described. In the exemplary embodiment depicted in FIG. 9, contests at a first level are directed at subject matter from national parks, namely YOSEMITE 902, YELLOWSTONE 904, the GRAND CANYON 906, and ZION 908. In this regard, the images submitted in the YOSEMITE 902 contest includes the images 910-918. Similarly, images submitted in the YELLOWSTONE 904, GRAND CANYON 906, and ZION 908 contests includes the images 920-928, 930-938, and 940-948, respectively. Each of the images submitted in the contests can be scored, ranked, and annotated in the various ways described above with reference to FIGS. 1-8.

Images submitted in a first contest can be readily submitted and judged in a second, related, contest. In the example depicted in FIG. 9, the image of "Half-Dome" 910 originally submitted in the YOSEMITE 902 contest receives the highest score and is judged the winner of this contest. As part of the judging process, the "Half-Dome" 910 image is annotated to identify the subject matter in the image, namely an outdoor landscape. Subsequently, a second level contest having the defined topic of BEST LANDSCAPES 950 is created. To populate this contest, a search is performed for previously submitted images that satisfy the requirements for entry into the BEST LANDSCAPES 950 contest. In this regard, the entry requirements for this second level contest are configurable in a number of different way. A contest creator can, for example, define parameters to search for images of "outdoor landscapes" that are winners of previous contests. Other examples of configurable entry requirements include, but are not limited to subject matter, threshold scores or placements, geographic location, users or groups, photographer, time period, and/or any other metadata category associated with a set of images. In the example depicted in FIG. 9, the search results performed for images to automatically enter into the BEST LANDSCAPES 950 contest further includes the "Half Dome" 910, "Old Faithful" 920, and "Cathedral Mountain" 940 images, respectively.

Figure 9:
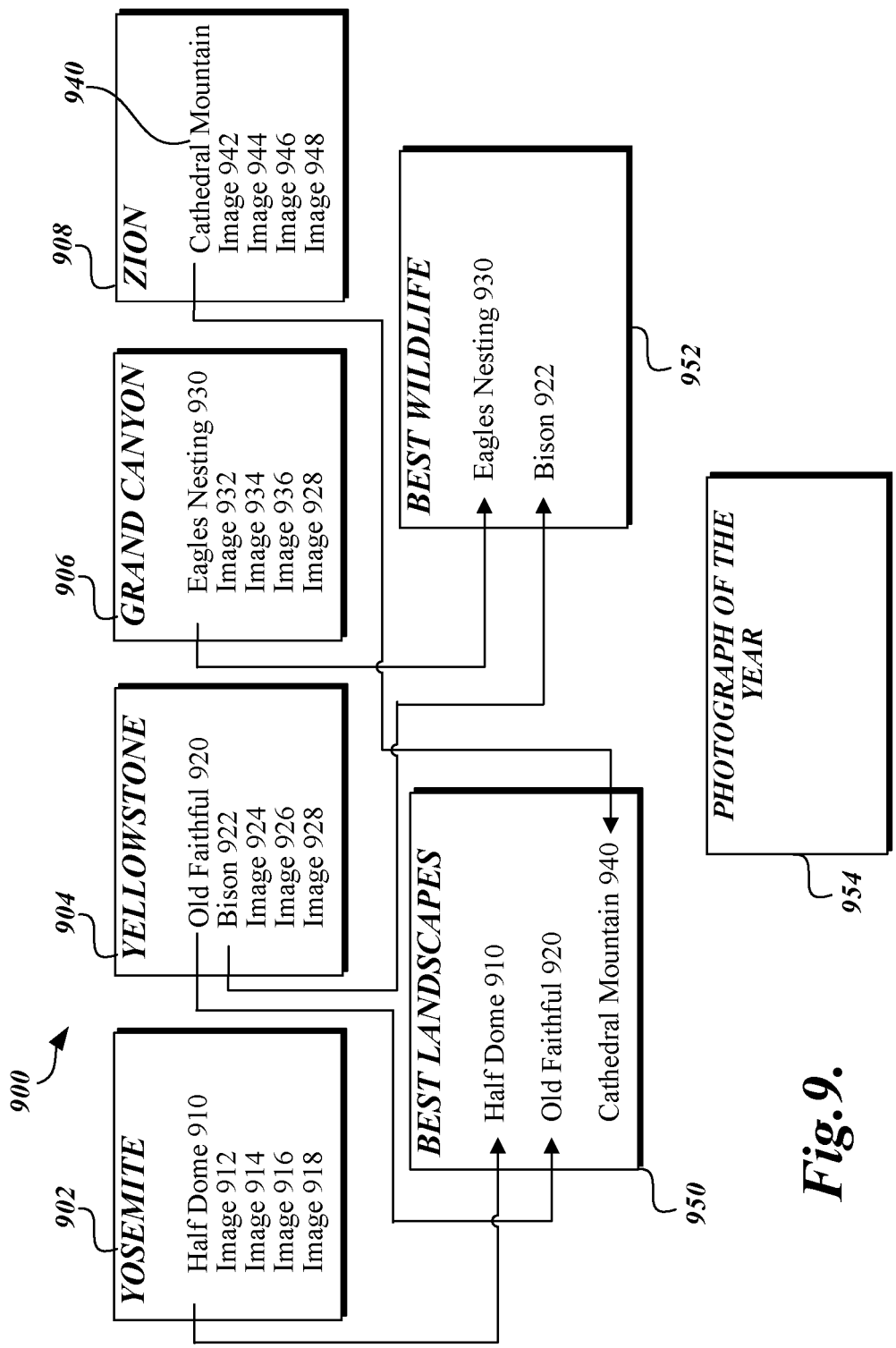
FIG. 9 is a pictorial depiction of a block diagram that illustrates multi-level contests in accordance with the present disclosure.

As further depicted in FIG. 9, other second level contests such as the BEST WILDLIFE 952 contest may be created and managed by aspects of the present disclosure. Similar to the description provided above, a search is performed for previously submitted images that satisfy the requirements for entry into the BEST WILDLIFE 952 contest. In the example depicted in FIG. 9, the search results of images that are automatically entered into this contest includes the "Eagles Nesting" 930 and "Bison" 922 images, respectively. Subsequently, a third level contest having the defined topic of PHOTOGRAPH OF THE YEAR 954 is created. To populate this contest, a search may be performed from previously conducted contests to identify the very best images submitted to the system for the previous year. By conducting contests in the way depicted and described with reference to FIG. 9, the present disclosure is able to sort through, identify, and promote the very best or most impactful images submitted to the system from potentially a massive corpus of digital content. Moreover, the present disclosure is better able to engage a user base by conducting multiple, tiered contests, when compared to a more ad-hoc contest management system.

One skilled in the art and others will recognize that the architecture described with reference to FIG. 9 is a highly simplified representation of a contest management system and that other embodiments are possible without departing from the scope of the claimed subject matter. Moreover, the examples provided with reference to FIG. 9 are exemplary and merely identify one way of managing a set of related contests. In this regard, the examples provided with reference to FIG. 9 describes a management system in which contests that have more-specific topics (i.e. images from national parks) are initially conducted. Then, contests with more general topics (i.e. landscape images) that draw from images submitted in the more-specific contests are conducted. However, in other embodiments, relationships between the contests and submitted images is different than described with reference to FIG. 9. For example, the contest management system described herein may be readily used and is extremely well-suited at narrowing in and identifying images that involve a very specific topic of interest. In this instance, a first level of contests or showcases may involve a general topic (e.g. fishing) in which a broad-range and/or large corpus of images are submitted. Subsequent contests or showcases may narrow the corpus of images submitted in the general contest in very specific ways. For example, subsequent contests may identify images that involve "Blue-Gill Fishing" or "Bass Fishing" with still further contests or showcases involving still narrower topics such as "Blue-Gill Fishing in California" or "Bass Fishing in Arkansas," respectively. As a result, users are able to narrow in on and access digital content involving a very specific subject matter of interest to them. Accordingly, one skilled in the art will recognize that the examples provided with reference to FIG. 9 are exemplary and should not be construed as limiting.

Meta-Data Enhanced Tokens for Contest Entry

In one aspect of the present disclosure, a user is able to obtain monetary credits for their account which may be used to make purchases in the marketplace. Each credit may have associated metadata which describes certain unique attributes. Instead of a simple record describing the quantity of credits or separate records for each transaction, a credit can exist as a unique object that is extensible. In this regard, the attributes of the credit object may include, but are not limited to, transaction type (purchase, award, etc.), actual cost, actual revenue, date of transaction, and geolocation of transaction, among others.

Typically, the credit metadata is not made available to the user, who is able to access a summary of the quantity of available credits and a history of transactions with credits. The metadata is used for both analytics regarding the purchase of credits but also for financial management of the system. By maintaining an analysis of the origins of credits, functionality is provided to track how much real money is in the marketplace economy against promotional credits. This analysis assists in managing the amount of money that may be made available to award winners and how much money has been spent on entering a contest instead of promotional credits.

In some embodiments, a user may deploy credits, tokens, money, or other type of compensation to boost a pending submission in one or more ways. In this regard, tokens earned from previous competitions may be applied to a pending submission to enhance the submission, such that the enhancement gives the submission a multiplier that elevates its performance in some way. In this regard, credits expended in this way may be used to increase exposure of a submission during a competition. Moreover, tokens can be deployed to 'amplify' the ratings received, either as a multiplier ("1.1× for 5 tokens, 1.2× for 10 tokens"), or in a way that is additive ("Add 50 points for every token expended").

Aspects of the present disclosure are configured to provide alerts to users regarding their submissions and progress of the competition. A user may be alerted by email, text message, or other means with an alert message. For example the alert message could state: "You are in the top 20%, want to submit another image for 50% off?" By way of another example the alert message could state: "Here is the winning image as of right now—submit another image?" More generally, the system provided by the present disclosure is able to contact the user (through email, SMS, etc.) with promotions or opportunities to submit further images or perform other tasks. In this regard, the system may allow users to replace their first submission with subsequent entries. In this instance, the alert message may state: "Your first image ranked top 20%, send a better one and see if you can do better."

Variable Value Credits Related to a Revenue Generating Event

In additional embodiments of the present disclosure, the submission of an image to a contest is a revenue-generating event. When a revenue-generating event occurs and the user has credits with different financial values, their credits may be placed in a virtual escrow. In this regard, the user's credit values may be stored such that a future determination can be made to identify which credit value to use in completing the revenue-generating event. Aspects of the present disclosure may initially attempt to "spend" the credit with the least financial value (i.e. credits given away as promotions) while still achieving the expected profit generation for a particular contest. More generally, any combination of user credits that have different financial values may be used in a dynamic manner to complete the revenue-generating event and/or optimize profitability. In additional aspects of the present disclosure, the combination of users' credits that have different financial values are managed and adjusted if the user's variable credits need to be considered across multiple events that are happening concurrently.

Managing the Flow of Expenses and Revenue

As expenses are incurred and bills received, aspects of the present disclosure may verify and accept a bill as a technical expense for a given period. Based upon the time frame for the expense, functionality is provided to anticipate the number of upcoming transactions in a configurable period and reserve funds from revenue-generating transactions. In this way, the present disclosure may manage the flow of funds in order to ensure that the necessary money is available to pay off the technical expense at the appropriate period of time.

In addition to managing the payment of expenses, aspects of the present disclosure also manage the flow of revenue. For each revenue-generating event (or contest), desired profit and expense levels are identified as determined in the revenue-controlled force ranking process. At the end of the revenue-generating event, funds that were not actually spent may be maintained in an expense reserve. In this instance, the present disclosure may maintain funds separate from generated profit so that the funds are available for future processes in a way that ensures consistent profit generation.

While the preferred embodiments of the present disclosure have been illustrated and described, it will be appreciated that various changes can be made therein without departing from the spirit and scope of the disclosed subject matter.

The embodiments of the disclosure in which an exclusive property or privilege is claimed are defined as follows:

1. A method that determines whether a submitted image satisfies a geographic constraint, the method comprising:
    defining a rule that establishes a geographic restriction on the submitted image;
    in response to receiving a submission to a contest, accessing a geo-code associated with the submitted image;
    determining whether the geo-code indicates that the submitted image was taken at a location that violates the geographic restriction defined in the rule, wherein a user is required to submit the image from a geographic location within an area defined in the rule and within a defined time window; and
    if a determination is made that the submitted image was taken either at a location that violates the geographic restriction defined in the rule or outside the defined time window, routing the image submission to an annotator, prompting the annotator to determine whether content in the image is indicative of a rule violation, and eliminating the submitted image from being considered a valid entry in the contest.

2. The method as recited in claim 1, further comprising if a determination is made that the geo-code associated with the submitted image is not indicative of a geographic rule violation, continuing to process the submitted image as a valid contest entry.

3. The method as recited in claim 1, wherein accessing a geo-code associated with the submitted image includes causing an application on a user computing device to obtain GPS data having the spatial coordinates that identify where the submitted image was captured.

4. The method as recited in claim 3, further comprising translating the spatial coordinates that identify where the submitted image was captured into a geo-code that identifies a geographic landmark.

5. A system for processing an image, the system comprising:
    a client application component operable to obtain GPS data from a computing device that provides the spatial coordinates where an image was captured and translates the spatial coordinates associated with the image into a geo-code which identifies a geographic location associated with the spatial coordinates; and
    a pre-processing component operable to:
        access the geo-code generated by the client application component;
        determine whether the geo-code indicates that the submitted image was taken at a location that violates a geographic restriction defined in a rule, wherein a user is required to submit the image from a geographic location within an area defined in the rule and within a defined time window; and
    if a determination is made that the image was taken at either a location that violates the geographic restriction defined in the rule or outside the defined time window, routing the image submission to an annotator, prompting the annotator to determine whether content in the image is indicative of a rule violation and eliminating the image from being considered a valid entry in the contest.

6. The system as recited in claim 5, wherein the pre-processing component is further operable to enable a contest creator define contest criteria in which scores are assigned to images submitted to the contest based on how well a particular image satisfies the contest criteria.

7. The system as recited in claim 5, further comprising a force ranking component operable to cause images to be ranked against other submissions by annotators that interact with the client application component which is further operable to present a plurality of images to the annotators and obtain feedback that ranks the quality the presented images.

8. The system as recited in claim 7, wherein the force ranking component is further operable to present a list of qualifiers to an annotator that may be used describe an associated image, accept a selection of a specific qualifier, and associate the qualifier with the image as file metadata.

9. The system as recited in claim 7, wherein the force ranking component is further operable to:
    present a theme to an annotator that describes the subject matter of a contest;
    accept feedback regarding whether a submitted image contains subject matter consistent with the theme; and
    if a determination is made that the content in the image is not consistent with the theme, eliminating the image from being considered a valid entry in the contest.

10. The system as recited in claim 5, further comprising a machine vision component operable to identify content in the image and determine whether the identified content is consistent with the geographic restriction defined in the rule.

11. The system as recited in claim 5, wherein the machine vision component is further operable to:
    identify content in the image that consists of either brand promotion or nudity; and
    if a determination is made that the content in the image is prohibited by a rule against either brand promotion or nudity, eliminating the image from being considered a valid entry in the contest.

12. The system as recited in claim 5, further comprising a contest theme module operable to manage multiple levels of contests including one or more first level contests in which a plurality of image submissions are received and annotated, the image submissions having subject matter relevant to a them associated with the one or more first level contests, and a second level contest in which annotations from the one or more first level contests are searched and images having annotations relevant to the second level-contest are identified and automatically entered into the second level contest.

* * * * *